Patented Mar. 2, 1926.

1,574,842

UNITED STATES PATENT OFFICE.

CLARENCE A. NASH, OF MILWAUKEE, WISCONSIN, ASSIGNOR TO THE CUTLER-HAMMER MFG. CO., OF MILWAUKEE, WISCONSIN, A CORPORATION OF WISCONSIN.

PLASTIC COMPOSITION MATERIAL AND METHOD OF PRODUCING THE SAME.

No Drawing.   Application filed July 13, 1922.   Serial No. 574,790.

*To all whom it may concern:*

Be it known that I, CLARENCE A. NASH, a citizen of the United States, residing at Milwaukee, in the county of Milwaukee and State of Wisconsin, have invented new and useful Improvements in Plastic Composition Materials and Methods of Producing the Same, of which the following is a full, clear, concise, and exact description.

This invention relates to plastic composition materials and to method of producing the same.

More particularly the invention relates to materials and to production of materials adapted to form-giving treatment under pressure with subsequent or concurrent heat curing, such materials ordinarily comprising a binder and a relatively inert filler impregnated thereby.

In a patent of Linwood T. Richardson, No. 1,508,124, dated September 9, 1924, is disclosed material of the general character aforestated together with method of producing the same and the present invention has as an object that of improving such material.

Another object is that of providing such material whereof the finished shapes exhibit increase in mechanical strength and also marked increase in dielectric properties.

Another object is that of improving the superficial finish of the formed and cured pieces comprising such material.

Another object is that of providing such a plastic material having an augmented flow during form-giving treatment at ordinary temperature.

Another object is that of providing such a binder substance which is adapted to impregnate relatively increased quantities of filler for production of plastic material adapted to form-giving treatment at ordinary temperature and possessing the foregoing improved characteristics.

Another object is that of providing process of producing such improved material.

Other objects and advantages of the invention will hereinafter appear.

The binder disclosed in said patent comprises generically a resin which is the product of arrested or otherwise incomplete condensation reaction of a phenolic body and methylene substance, such body and substance being present in the binder in proportions such as to afford approximately equal numbers of phenolic and methylene groups, approximately half the phenolic groups, however, being in a potentially reactive state with reference to similarly potentially reactive methylene substance of the binder.

The phenolic body may comprise phenol, cresol or homologues thereof, whereas the methylene substance may comprise hexamethylenetetramine, formaldehyde or a polymer. Such substances have been found capable, under suitable conditions of control and the like, of reaction to produce a binder as aforecharacterized which when incorporated with a suitable filler, such for example as asbestos, is well adapted to form-giving treatment under pressure at ordinary temperatures with subsequent heat cure for completion of the condensation reaction.

According to the present invention it is proposed to improve the aforedescribed product by incorporating therein a substance proposed in Steinberg Patent, No. 1,233,415. More specifically the present invention contemplates incorporation of a quantity of stearine pitch in the resin aforecharacterized, and I have found that as a result of such addition prior to the addition of the filler the character of the product may be modified and improved as aforedescribed.

Also it is proposed herein to incorporate in such binder material a reduced quantity of another substance, such for example as sulphur which I have found is adapted, under the conditions imposed, to coact with stearine pitch added as aforementioned probably by way of vulcanization for further improvement of the product in the particulars aforenoted among others.

As typical of the manner in which the afore-indicated process may be enacted, a quantity of stearine pitch is melted and to it is added approximately thirty per cent of its weight of a volatile or other solvent such for example as benzol, coal tar oil or the like. A quantity of this thinned material sufficient to contain 15 parts by weight of stearine pitch is then thoroughly mixed with approximately 142 parts by weight of a phenolic condensation resin, which resin may advantageously comprise substantially fifteen potentially reactive phenolic groups to each six phenolic groups condensed with methylene substance, the corresponding number of potentially reactive methylene groups being also present.

The binder produced as aforedescribed is thereafter incorporated with approximately 500 parts by weight of asbestos or other suitable relatively inert filler material, together with five parts by weight of sulphur, the incorporation being preferably effected in a kneading machine or the like.

Following such mixture and incorporation of the foregoing ingredients the plastic material may be comminuted, screened and subjected to other suitable or desired known treatment, following which the same is in condition for form-giving treatment at ordinary temperature, relatively high pressure being ordinarily employed.

Following the form-giving treatment the resultant shapes are subjected to prolonged heat cure of an intensity and duration determined by the size, shape and other characteristics of the pieces themselves and also dependent upon other considerations. Such heat cure is enacted for the purpose of completing the phenolic condensation reaction whereas it is believed that during such cure a vulcanizing action takes place between the sulphur and a portion of the stearine pitch, whereby the character of the formed and cured pieces is much improved in strength, dielectric properties and finish.

Also the addition of the stearine pitch to the resin has been found to produce marked increase in flow and other desirable characteristics of the product during the form-giving treatment and to enable employment of a resin which is in a more advanced state of condensation than would otherwise be feasible for quick molding purposes. Again such addition of stearine pitch has been found to increase markedly the quantity of filler material which may be incorporated with a given amount of the binder.

It is of course to be understood that the step of thinning or dissolving the stearine pitch in a solvent prior to addition to the resin is not absolutely essential herein although by employment of this step the addition and incorporation of the stearine pitch is greatly facilitated and expedited. Also it is to be understood that while the proportions aforestated have been found quite satisfactory and desirable in practice, nevertheless such proportions as well as the stage of reaction of the resin employed are capable of rather wide variation not only without detriment to the product but in certain instances with actual improvement thereof for specific purposes and under special conditions.

What I claim as new and desire to secure by Letters Patent is:

1. The process of treating a phenolic condensation resin, which comprises incorporating in approximately nine and one-half parts thereof substantially one part of stearine pitch.

2. The process of producing a binder for use in plastic compounds, which comprises incorporating, in approximately nine and one-half parts of a phenolic condensation resin, substantially one part of stearine pitch.

3. The process of producing a binder for use in plastic compounds, which comprises incorporating, in nine and one-half parts of a resinous product of incomplete condensation of a phenolic body and methylene substance, substantially one part of stearine pitch.

4. The process of producing a binder for use in plastic compounds, which comprises incorporating, in a resinous product of incomplete condensation of a phenolic body and methylene substance, a quantity of stearine pitch and a relatively reduced quantity of sulphur.

5. The process of producing plastic composition material which comprises incorporating, in a resinous product of incomplete condensation of a phenolic body and methylene substance, approximately one-tenth part by weight of stearine pitch to produce a binder, and impregnating a relatively inert filler with such binder.

6. The process of producing plastic composition material which comprises incorporating, in a resinous product of incomplete condensation of a phenolic body and methylene substance, a quantity of stearine pitch and a lesser quantity of sulphur and impregnating a relatively inert filler with the resultant binder.

7. The process of producing plastic composition material, which comprises incorporation, in a resinous product of incomplete condensation of a phenolic body and methylene substance, said product comprising approximately equal numbers of phenolic and methylene groups and approximately half of said phenolic and methylene groups being in a potentially reactive state with reference to each other, of relatively reduced quantities each of stearine pitch, thinned with a suitable solvent, and sulphur, and impregnating a relatively inert filler with the binder so produced.

8. The process of producing hardened shapes, which comprises incorporating in a resinous product of incomplete condensation of a phenolic body and methylene substance, a quantity of stearine pitch and a lesser quantity of sulphur to produce a binder, impregnating a relatively inert filler material with such binder, forming the material under pressure and also heat curing the material to promote hardening of the stearine pitch with the sulphur and to complete the condensation reaction.

9. A binder for plastic composition material, comprising a resinous product of incomplete condensation reaction between substantially equal numbers of phenolic and methylene groups, having incorporated therein substantially one-tenth part by weight of stearine pitch.

10. A binder for plastic composition material, comprising a resinous product of incomplete condensation reaction between substantially equal numbers of phenolic and methylene groups, having incorporated therein quantities each of stearine pitch and sulphur.

11. A plastic composition material, comprising a product of incomplete condensation of a phenolic body and methylene substance, having substantially one-tenth part by weight of stearine pitch incorporated therein, and a relatively inert filler material impregnated with the binder so produced.

12. A plastic composition material, comprising a product of incomplete condensation of a phenolic body and methylene substance, having incorporated therein a quantity of stearine pitch and a relatively reduced quantity of sulphur, as a binder, and a relatively inert filler material impregnated with such binder.

13. A hardened shape, comprising a phenolic condensation product binder having incorporated therein a quantity of stearine pitch and also a relatively reduced quantity of sulphur, and an inert filler impregnated with such binder, formed under pressure and heat treated to promote hardening of the stearine pitch with the sulphur.

14. An article of manufacture, comprising a formed and heat hardened substance including an inert filler impregnated with a binder comprising a product of incomplete condensation of a phenolic body and methylene substance and incorporated quantities each of stearine pitch and sulphur.

In witness whereof, I have hereunto subscribed my name.

CLARENCE A. NASH.